United States Patent [19]

Nowaczyk

[11] 4,408,269

[45] Oct. 4, 1983

[54] BALANCED POWER SUPPLY WITH POLARIZED CAPACITORS

[75] Inventor: Philip J. Nowaczyk, Chicago, Ill.

[73] Assignee: Zenith Radio Corporation, Glenview, Ill.

[21] Appl. No.: 389,744

[22] Filed: Jun. 18, 1982

[51] Int. Cl.³ .............................................. H02M 7/06
[52] U.S. Cl. ..................................... 363/126; 307/321
[58] Field of Search ................ 307/146, 321; 363/125, 363/126, 128, 67, 69, 70

[56] References Cited

U.S. PATENT DOCUMENTS

| | | | |
|---|---|---|---|
| 3,001,120 | 9/1961 | Bereskin | 363/126 |
| 3,378,748 | 4/1968 | Bull | 363/126 X |
| 4,131,939 | 12/1978 | Day | 363/126 |
| 4,245,294 | 1/1981 | Brolin | 363/81 |

FOREIGN PATENT DOCUMENTS

| | | | |
|---|---|---|---|
| 584303 | 12/1977 | U.S.S.R. | 363/126 |
| 589677 | 1/1978 | U.S.S.R. | 363/128 |

*Primary Examiner*—William M. Shoop

[57] ABSTRACT

A balanced, constant current power supply having two rectifying bridges coupled in parallel is energized by an AC source for generating a plurality of DC output voltages. The parallel arrangement of diode rectifying bridges permits the use of low cost, polar electrolytic capacitors in the power supply and results in a balanced circuit capable of generating a plurality of parallel DC outputs. The AC-driven, DC power supply of the present invention operates without a transformer and, in combination with a plurality of shunt regulators, is capable of providing a plurality of well-regulated DC output voltages.

13 Claims, 1 Drawing Figure

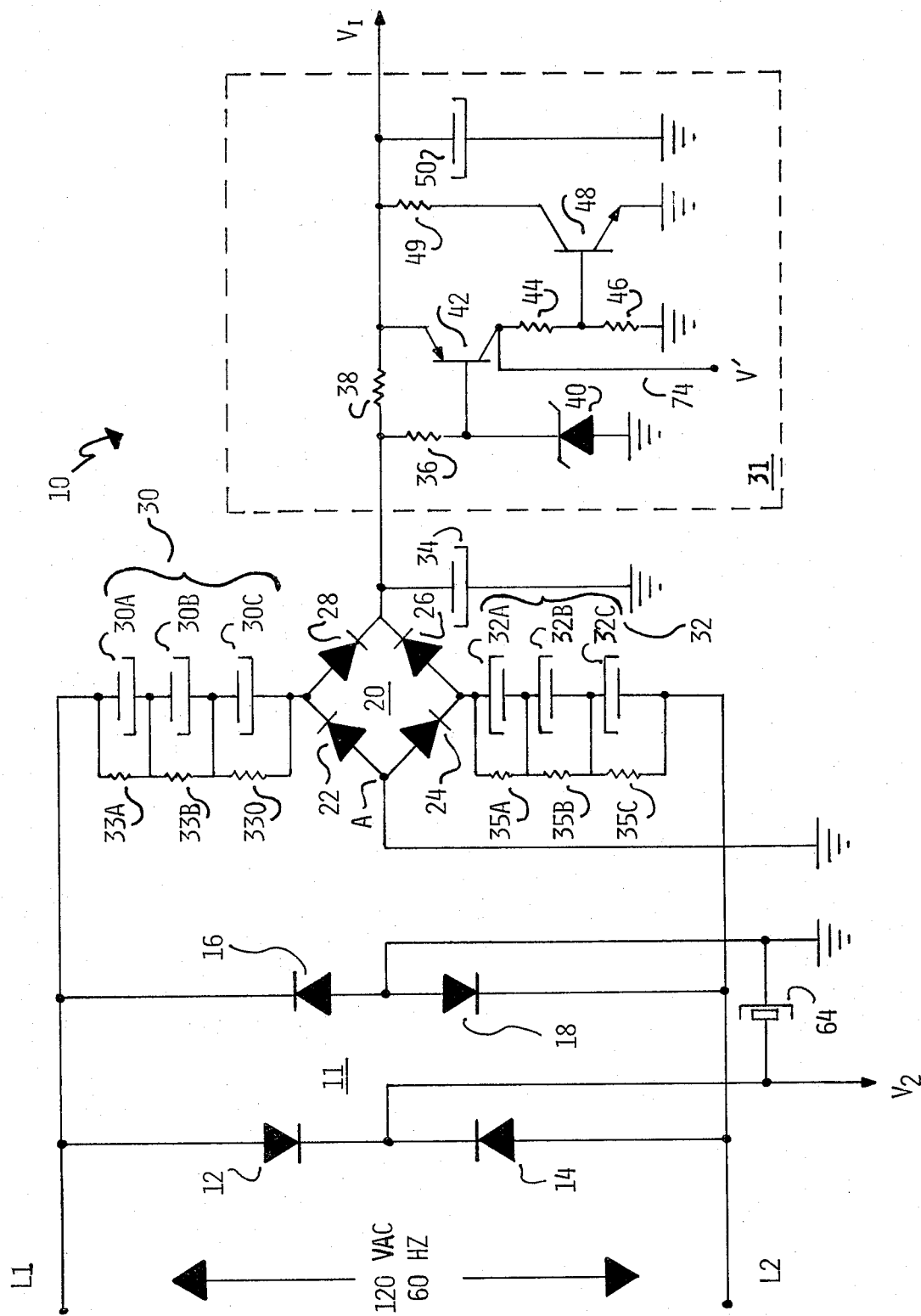

BALANCED POWER SUPPLY WITH POLARIZED CAPACITORS

CROSS-REFERENCE TO RELATED APPLICATION

This application is related to the following application which is assigned to the assignee of the present application: Ser. No. 370,316, filed Apr. 21, 1982, entitled "Microprocessor Power On Reset System", in the name of Arthur N. Borg.

BACKGROUND OF THE INVENTION

This invention relates generally to DC power supplies and is particularly directed to a transformerless power supply capable of providing a plurality of well-regulated DC output voltages.

DC power supplies energized by an AC input typically employ a diode rectifying bridge for converting the alternating input to a DC output voltage. This type of power supply generally utilizes a non-polar capacitor coupling the AC source to one input of the rectifier for reducing the input voltage to a more convenient level. A non-polarized capacitor is utilized because of the reverse voltage applied across it in the AC line. A capacitor of this general type utilizes electrolytic material capable of supporting high currents and voltages which adds to the expense of the DC power supply. In some DC power supplies of this general type a resistor is utilized in place of the aforementioned non-polar capacitor. However, the use of a resistor generally results in excessive power dissipation in the power supply.

Thus, prior art DC power supplies incorporating a rectifying bridge are basically capacitive or resistive networks converting a high input voltage to a low output voltage and, as such, operate as a constant current source. Such power supplies generally permit the output voltage to assume any value (within reason) necessary for providing a constant output current. This is undesirable in that excessive currents and voltages may be produced by such power supplies. In addition, a series regulator is required for output voltage regulation. The series regulator tends to use more power than a voltage regulator in parallel with the power supply and to impose a varying load on the power supply making output voltage regulation very difficult. As such, these series regulated power supplies are generally not capable of providing a plurality of well-regulated DC output voltages without incorporating a transformer in the power supply which necessarily increases the cost and the complexity of the power supply.

U.S. Pat. No. 4,198,660 to Ferracini discloses a DC supply circuit wherein a resistor is coupled to one input of a full wave bridge rectifier for limiting the current provided thereto. As previously stated, this approach to input voltage reduction to a more manageable level by current limiting results in excessive power dissipation in the power supply. U.S. Pat. No. 4,207,516 to Babcock discloses a switching regulator for regulating an input voltage having an AC component which employs a full wave bridge rectifier at the input thereof. The full wave rectifier is conventional in design, incorporating four coupled diodes. Across each diode is shunted a bypass capacitor and across the entire rectifier bridge is coupled an RF bypass capacitor. The former bypass capacitors are subjected to the alternating voltage applied across the respective diodes and thus are non-polar capacitors, while the latter bypass capacitor performs a signal filtering function with respect to the output of the rectifier bridge. This power supply includes of series switching regulator and, as such, is not capable of providing a plurality of well-regulated DC output voltages.

The present invention is intended to overcome the aforementioned limitations of the prior art by providing a DC power supply capable of generating a plurality of well-regulated output voltages from an AC input without utilizing a transformer and in which power supply cost is reduced by utilizing inexpensive, commonly available polar capacitors.

OBJECTS OF THE INVENTION

Accordingly, it is an object of the present invention to provide an improved DC power supply.

It is another object of the present invention to provide an inexpensive, transformerless power supply capable of providing a plurality of well-regulated DC output voltages.

Still another object of the present invention is to provide a constant current power supply for use in combination with a shunt regulator for providing a level DC output voltage.

A further object of the present invention is to reduce the cost of a DC power supply by utilizing polar capacitors therein.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawing, in which there is illustrated a schematic diagram of a DC power supply in accordance with a preferred embodiment of the present invention.

DESCRIPTION OF THE PREFERRED EMBODIMENT

Referring to the Figure, there is shown a schematic diagram of a balanced DC power supply 10 in accordance with the present invention.

An AC input which typically is a 120 VAC, 60 Hz source is coupled to lines L1, L2. This AC input is coupled to two terminals of a diode rectifying bridge via serially coupled polar capacitors 30A, 30B, 30C and 32A, 32B, 32C, respectively. Bridge 20 rectifies the AC input in a conventional manner by means of the alternate conduction of diodes 26, 28, resulting in a DC output being provided to a shunt regulator 31.

Across each of the polar capacitors 30A, 30B and 30C, which may be collectively designated as polar capacitance 30, are respectively coupled resistors 33A, 33B and 33C. Similarly, across respective polar capacitors 32A, 32B and 32C, which may collectively be referred to as polar capacitance 32, are coupled resistors 35A, 35B and 35C. Polar capacitances 30, 32 limit the AC input voltage applied to the input terminals of rectifying bridge 20 to convenient levels in generating DC outputs therefrom. The resistors shunted across each of the serially coupled polar capacitors equalize the voltage across each of these capacitors permitting inexpensive, low voltage, commonly available polar capacitors to be used in the present invention rather than the more expensive non-polar capacitors commonly utilized in prior art DC power supplies. To allow for the use of these polar capacitors in the DC power supply of the present invention, the reverse voltage applied across these capacitors must be carefully controlled and limited in value so as not to result in the destruction of these capacitors. This is accomplished in the following manner by the present invention.

As previously stated, during one half of the AC input cycle diode 26 in the rectifier bridge 20 is rendered conductive, while during the other one half cycle diode 28 is rendered conductive for producing a DC output therefrom. Similarly, diodes 12, 14, which are coupled across AC input lines L1, L2, are respectively rendered conductive during alternating half cycles of the AC input signal. This permits DC output voltages $V_1$, $V_2$ to be generated from the AC input. Grounded filter capacitor 64 removes any ripple from the output of diodes 12, 14 in insuring a level DC output signal therefrom.

Also coupled across the AC input lines L1, L2 are back diodes 16, 18 which provide a return current path for and thus balance power supply 10 with respect to ground in the following manner.

During one half cycle of the AC input a positive pulse is applied via polar capacitance 30 across diode 28 rendering it conductive. The output of the bridge rectifier 20 is then provided across grounded capacitor 34 and to shunt regulator 31 which outputs a well-regulated DC output $V_1$. Capacitor 34 is charged to the peak voltage of the aforementioned input provided thereto with current then returning via ground from capacitor 34, shunt regulator 31 and a load (not shown) to point A in bridge rectifier 20. Diode 24 is then rendered conductive only long enough to fully discharge polar capacitance 32. After polar capacitance 32 has been fully discharged, diode 18, which is in parallel with diode 24 and serially coupled polar capacitance 32 in providing a ground return path to AC input line L2, is rendered conductive. Current then flows through diode 18 to AC input line L2 completing the circuit path back to the AC input. By thus limiting the reverse voltage applied across polar capacitance 32, the present invention allows for the use of such polar capacitors which result in a reduction in the cost of the DC power supply.

During the other half cycle of the AC input provided to line L2, a pulse is provided via polar capacitance 32 to diode 26 in the rectifier bridge 20 rendering it conductive. The rectified output from bridge 20 is then provided to grounded capacitor 34, shunt regulator 31, and a conventional load (not shown). These elements of the power supply are, of course, referenced to neutral ground potential and provide a ground return path for current to the AC input lines L1, L2. During this half cycle of operation, an input signal is again provided to point A in the rectifier bridge 20 and thence across diode 22 rendering it conductive. This causes polar capacitance 30 to be fully discharged, and thereafter for current to return to the L1 input line via the parallel configuration of grounded back diode 16. This avoids an excessive reverse polarity voltage being applied across polar capacitance 30 which would result in its destruction. The lower impedances of coupled diodes 16, 18 thus provides a return current path to a respective AC input line following the complete discharge of a respective polar capacitance coupled in parallel with one of the diodes 16, 18. When one of the diodes 16, 18 is rendered conductive by the complete discharge of a respective polar capacitance 30, 32, the other diode is reverse biased and rendered nonconductive.

Thus, current initially flows through the rectifier bridge 20 via either diode 2 or diode 26. This results in a ground return path to point A of the rectifier bridge and thence through either diode 22 or diode 24 until polar capacitors 30A, 30B and 30C or polar capacitors 32A, 32B and 32C, respectively, are fully discharged. Following the discharge of a respective polar capacitor, or capacitors, a parallel shunt path to a respective AC input line is provided either by back diode 16 or back diode 18, thus completing the circuit. This alternating, parallel current path limits the back voltage applied across the polar capacitors to that necessary to fully discharge them and precludes an excessive reverse voltage being applied thereacross.

The DC output from bridge rectifier 20 is provided to shunt regulator 31 which includes an amplifying transistor 42 and a regulating transistor 48. This shunt regulator arrangement imposes a more constant load on the DC power supply 10 than a conventional series coupled regulator. The rectified output of bridge 20 is applied to the base of amplifier transistor 42 through resistor 36. Coupling the base of amplifier transistor 42 to neutral ground potential is Zener diode 40. When the voltage across Zener diode 40 provided by the output of rectifying bridge 20 exceeds the breakdown voltage of the Zener diode, it is rendered conducting and voltage in excess thereof is shunted to ground. Thus, amplifying transistor 42 is rendered conductive by the output voltage from bridge rectifier 20, which voltage is regulated by means of Zener diode 40. In a preferred embodiment, the output of rectifier bridge 20 is 9 VDC while Zener diode 40 and resistor 36 are selected so as to provide a regulated 4.7 VDC to the base of amplifier transistor 42.

When the voltage across resistor 46 exceeds the turn-on voltage of regulating transistor 48, which in a preferred embodiment is one half volt, transistor 48 will be rendered conductive. With regulating transistor 48 conducting, the DC output from rectifier bridge 20 is shunted via resistor 38, resistor 49, regulating transistor 48, and resistor 46 to ground. This insures that the emiter voltage of the amplifier transistor 42 and $V_1$ will not exceed a predetermined value, which in a preferred embodiment is 5.2 VDC. With the regulating transistor 48 shunting the output from rectifier bridge 20 via resistor 38 to ground, resistor 38 thus acts as a curent limiting resistor to limit current through the amplifier transistor 42. Grounded capacitor 50 filters the $V_1$ output of the shunt regulator 31.

While the present invention will operate with any conventional shunt regulator, the shunt regulator shown in the Figure is that used with a preferred embodiment of the present invention and is described and claimed in the above cross-referenced related patent application.

There has thus been disclosed a dual bridge, balanced DC power supply capable of providing a plurality of well-regulated DC voltages utilizing inexpensive polar capacitors. The present invention does not include a transformer and may be utilized in combination with a conventional shunt regulator for controlling the DC output voltage.

While particular embodiments of the present invention have been shown and described, it will be apparent to those skilled in the art that changes and modifications may be made therein without departing from the invention in its broader aspects. The aim of the appended claims, therefore, is to cover all such changes and modifications as fall within the true spirit and scope of the invention.

I claim:

1. A power supply energized by an AC input voltage provided on first and second input lines for generating at least one DC output voltage, said power supply comprising:

first rectifying means having first and second input terminals, a ground terminal and an output terminal upon which a first DC output voltage is developed;

first and second polar capacitive means coupling said first and second input lines to the first and second input terminals of said first rectifying means, respectively, for limiting the voltage applied thereto; and grounded conducting means coupled across said first and second input lines for providing a return current path for limiting the reverse voltage applied across said first and second polar capacitive means in preventing a voltage polarity reversal thereacross.

2. The power supply of claim 1 further including second rectifying means coupled to said first and second input lines for generating a second DC output voltage in response to said AC input voltage.

3. The power supply of claim 1 further including a shunt voltage regulator coupled to the output terminal of said first rectifying means for regulating said first DC output voltage.

4. The power supply of claim 1 further including first and second resistive means respectively coupled across said first and second polar capacitive means for equalizing the voltage applied across said capacitive means.

5. The power supply of claim 1 wherein said first and second polar capacitive means each include a plurality of serially coupled polar capacitors.

6. The power supply of claim 5 further including first and second pluralities of serially copuled resistors connected in parallel across said first and second polar capacitive means and wherein each resistor is connected in parallel across said first and second polar capacitive means and wherein each resistor is connected in parallel with a corresponding one of said polar capacitors.

7. The power supply of claim 2 wherein said second rectifying means includes coupled unidirectional conducting means each connected to one of said first and second input lines for alternately providing said second DC output voltage therefrom.

8. The power supply of claim 7 wherein said unidirectional conducting means are diodes coupled together by means of the respective anodes thereof and wherein the respective cathodes thereof are coupled to a respective one of said first and second input lines.

9. The power supply of claim 1 wherein said first rectifying means includes a bridge circuit having a plurality of unidirectional conducting means each positioned between adjacent terminals thereof.

10. The power supply of claim 1 wherein said grounded conducting means includes coupled unidirectional conducting means each connected to a respective one of said first and second input lines in providing a ground return current path thereto during alternating cycles of said AC input voltage.

11. The power supply of claim 10 wherein each unidirectional conducting means is a diode having an cathode coupled to a respective first or second input line, said diodes are connected by means of the respective anodes thereof, and said anodes are maintained at neutral ground potential.

12. The power supply of claim 11 wherein one of said diodes conducts during the first half cycle of said AC input voltage and the other diode conducts during the second half cycle of said AC input voltage in limiting the reverse voltage applied across respective polar capacitive means during said alternating half cycles.

13. In a DC power supply energized by an AC input voltage developed across a pair of AC input lines and including a bridge rectifier having first and second input terminals, a grounded terminal and an output terminal for providing a DC output voltage, the improvement comprising:

first and second polar capacitors coupling respective AC input lines to said first and second input terminals of said bridge rectifier for limiting the voltage applied thereto; and a pair of diodes having their anodes coupled in common to ground and their cathodes to a respective first or second input line for providing a return current path thereto for limiting the reverse voltage applied across said first and second polar capacitors in preventing a voltage polarity reversal thereacross.

* * * * *

UNITED STATES PATENT AND TRADEMARK OFFICE
CERTIFICATE OF CORRECTION

PATENT NO. : 4,408,269
DATED : 10/04/83
INVENTOR(S) : Philip J. Nowaczyk

It is certified that error appears in the above-identified patent and that said Letters Patent is hereby corrected as shown below:

In claim 6, line 2, cancel "copuled" and substitute therefor -- coupled--.

In claim 6, lines 5-7, delete the phrase "across said first and second polar capacitive means and wherein each resistor is connected in parallel".

Signed and Sealed this

Thirteenth Day of December 1983

[SEAL]

Attest:

Attesting Officer

GERALD J. MOSSINGHOFF

Commissioner of Patents and Trademarks